US012259111B2

(12) United States Patent
Meng et al.

(10) Patent No.: US 12,259,111 B2
(45) Date of Patent: Mar. 25, 2025

(54) ELECTRONIC DEVICE AND LIGHT-INDICATING MODULE THEREOF

(71) Applicant: Wistron NeWeb Corp., Hsinchu (TW)

(72) Inventors: Ching-Hsun Meng, Hsinchu (TW); Wei-Hung Liao, Hsinchu (TW); Yang-Chieh Ma, Hsinchu (TW); Hsueh-Chu Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 18/598,054

(22) Filed: Mar. 7, 2024

(65) Prior Publication Data

US 2024/0328605 A1 Oct. 3, 2024

(30) Foreign Application Priority Data

Mar. 30, 2023 (TW) ................................ 112112264

(51) Int. Cl.

*F21V 17/16* (2006.01)
*F21V 1/14* (2006.01)
*F21V 9/08* (2018.01)
*F21V 11/16* (2006.01)
*F21Y 107/90* (2016.01)
*F21Y 113/00* (2016.01)

(52) U.S. Cl.

CPC ............ *F21V 17/164* (2013.01); *F21V 1/146* (2013.01); *F21V 9/08* (2013.01); *F21V 11/16* (2013.01); *F21Y 2107/90* (2016.08); *F21Y 2113/00* (2013.01)

(58) Field of Classification Search

CPC ........... F21V 17/164; F21V 1/146; F21V 9/08
See application file for complete search history.

(56) References Cited

U.S. PATENT DOCUMENTS 3,555,543 A * 1/1971 Lynch ...................... G08B 5/36 362/291
3,639,745 A * 2/1972 Shiki ...................... H02B 1/048 200/314
4,984,142 A * 1/1991 Garnerone ............... G08B 5/36 362/240
5,103,215 A * 4/1992 Taylor ........................ F21V 3/00 340/815.76
5,929,788 A * 7/1999 Vukosic ............... B60Q 1/2611 340/471

(Continued)

*Primary Examiner* — Arman B Fallahkhair
(74) *Attorney, Agent, or Firm* — McClure, Qualey & Rodack, LLP

(57) ABSTRACT

An electronic device with light-indicating function is provided. The electronic device includes a substrate, a first light source, a second light source, and a light guiding element. The substrate includes a first surface and a second surface, wherein the first surface is opposite to the second surface. The first light source is disposed on the first surface of the substrate, wherein the first light source faces the first direction, and the first light source provides a first light beam. The second light source is disposed on the first surface of the substrate, wherein the second light source faces the second direction, the second light source provides a second light beam, and the first direction is not parallel to the second direction. The light guiding element includes a first section and a second section.

19 Claims, 7 Drawing Sheets

(56) References Cited

U.S. PATENT DOCUMENTS

| | | | | |
|---|---|---|---|---|
| 7,097,322 | B2 * | 8/2006 | Shuniak | F21S 2/005<br>362/372 |
| 7,794,107 | B2 * | 9/2010 | Schoen | H01H 9/161<br>362/276 |
| 9,297,935 | B2 * | 3/2016 | Santos | G02B 5/0242 |
| 9,958,136 | B2 * | 5/2018 | Santos | G02B 6/0021 |
| 10,571,690 | B2 * | 2/2020 | Ellis | B60K 35/21 |
| 2024/0134110 | A1 * | 4/2024 | Sannomiya | G02B 6/0083 |

* cited by examiner

M2

ELECTRONIC DEVICE AND LIGHT-INDICATING MODULE THEREOF

CROSS REFERENCE TO RELATED APPLICATIONS

This application claims priority of Taiwan Patent Application No. 112112264, filed on Mar. 30, 2023, the entirety of which is incorporated by reference herein.

BACKGROUND OF THE INVENTION

Field of the Invention

The present invention relates to an electronic device, and, in particular, to an electronic device with light-indicating function.

Description of the Related Art

Electronic devices commonly have a light-indicating module to display the status of certain indicators, such as power, volume, and network signal. The light-indicating module comes in various shapes. For example, it may be a horizontal strip indicator module. Conventionally, a horizontal strip indicator module includes a horizontal strip lampshade, a plurality of light-emitting diodes and a light-source board. The light-emitting diodes are arranged on the edge of the light-source board. The light-emitting diodes provide light, which passes through the horizontal strip lampshade. Since an additional light-source board is required to couple the light-emitting diodes to the mainboard of the electronic device, the component cost is increased and the assembly processes is more complicated.

BRIEF SUMMARY OF THE INVENTION

An embodiment of the present invention provides an electronic device with light-indicating function. The electronic device includes a substrate, a first light source, a second light source, and a light guiding element. The substrate comprises a first surface and a second surface, wherein the first surface is opposite to the second surface. The first light source is disposed on the first surface of the substrate, wherein the first light source faces the first direction, and the first light source provides a first light beam. The second light source is disposed on the first surface of the substrate, wherein the second light source faces the second direction, the second light source provides a second light beam, and the first direction is not parallel to the second direction. The light guiding element comprises a first section and a second section, wherein the first section corresponds to the first surface, the second section corresponds to the second surface, and the first light beam and the second light beam pass through the first section.

In another embodiment, a light-indicating module is provided. The light-indicating module includes a substrate, a first light source, a second light source, and a light guiding element. The substrate comprises a first surface and a second surface, wherein the first surface is opposite to the second surface. The first light source is disposed on the first surface of the substrate, wherein the first light source faces the first direction, and the first light source provides a first light beam. The second light source is disposed on the first surface of the substrate, wherein the second light source faces the second direction, the second light source provides a second light beam, and the first direction is not parallel to the second direction. The light guiding element comprises a first section and a second section, wherein the first section corresponds to the first surface, the second section corresponds to the second surface, and the first light beam and the second light beam pass through the first section.

In the electronic device of the embodiment of the invention, the first light source and the second light source are disposed directly on the mainboard (substrate), and the first light source and the second light source faces different directions. The first light beam and the second light beam pass through the light guiding element and provide the effect of strip lighting. Compared with the conventional art, the conventional light-source board is omitted. Therefore, the component cost is reduced and the assembly processes is simplified, and product reliability is improved.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
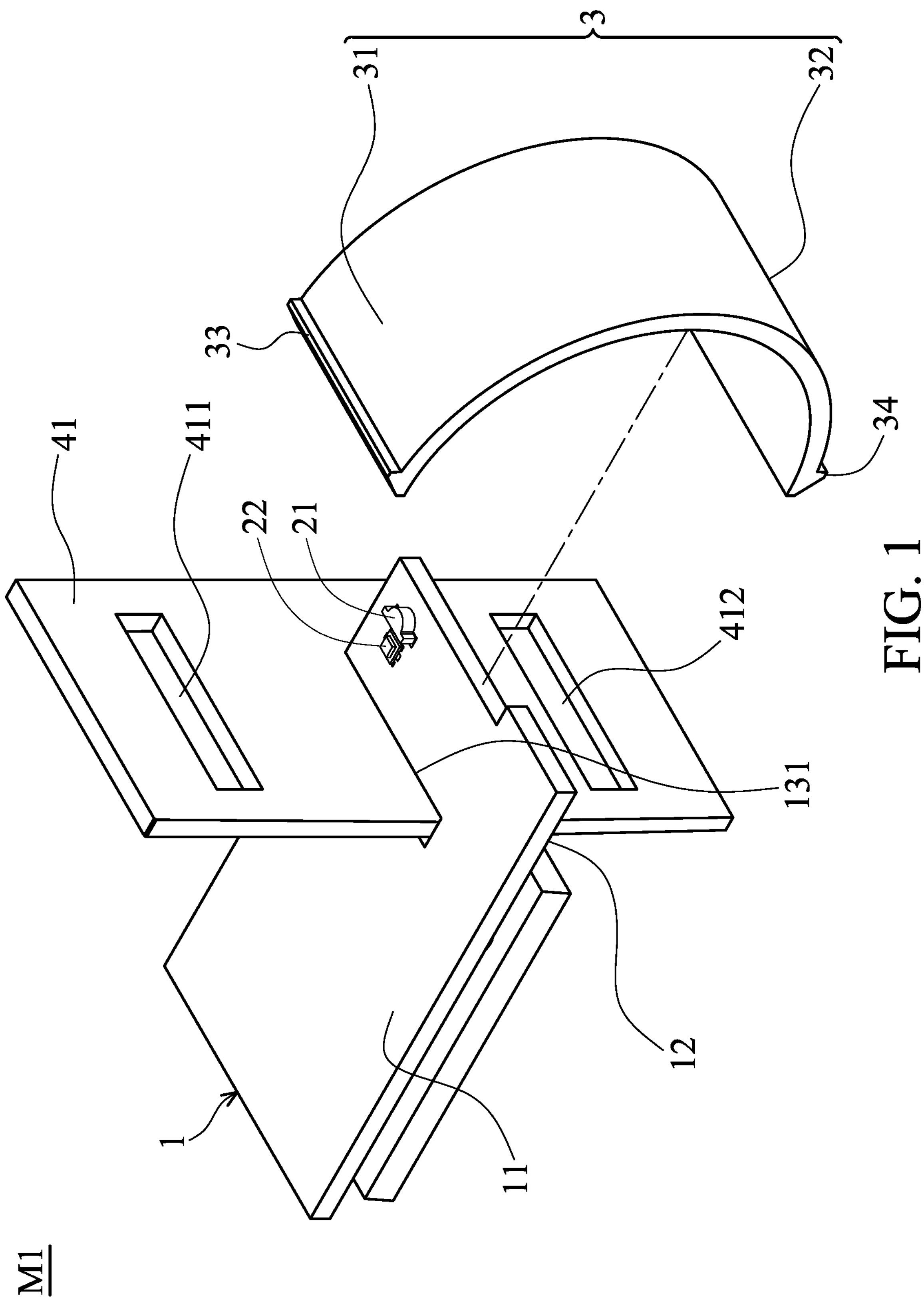
FIG. 1 is an exploded view of a portion of a light-indicating module of a first embodiment of the invention.
Figure 2:
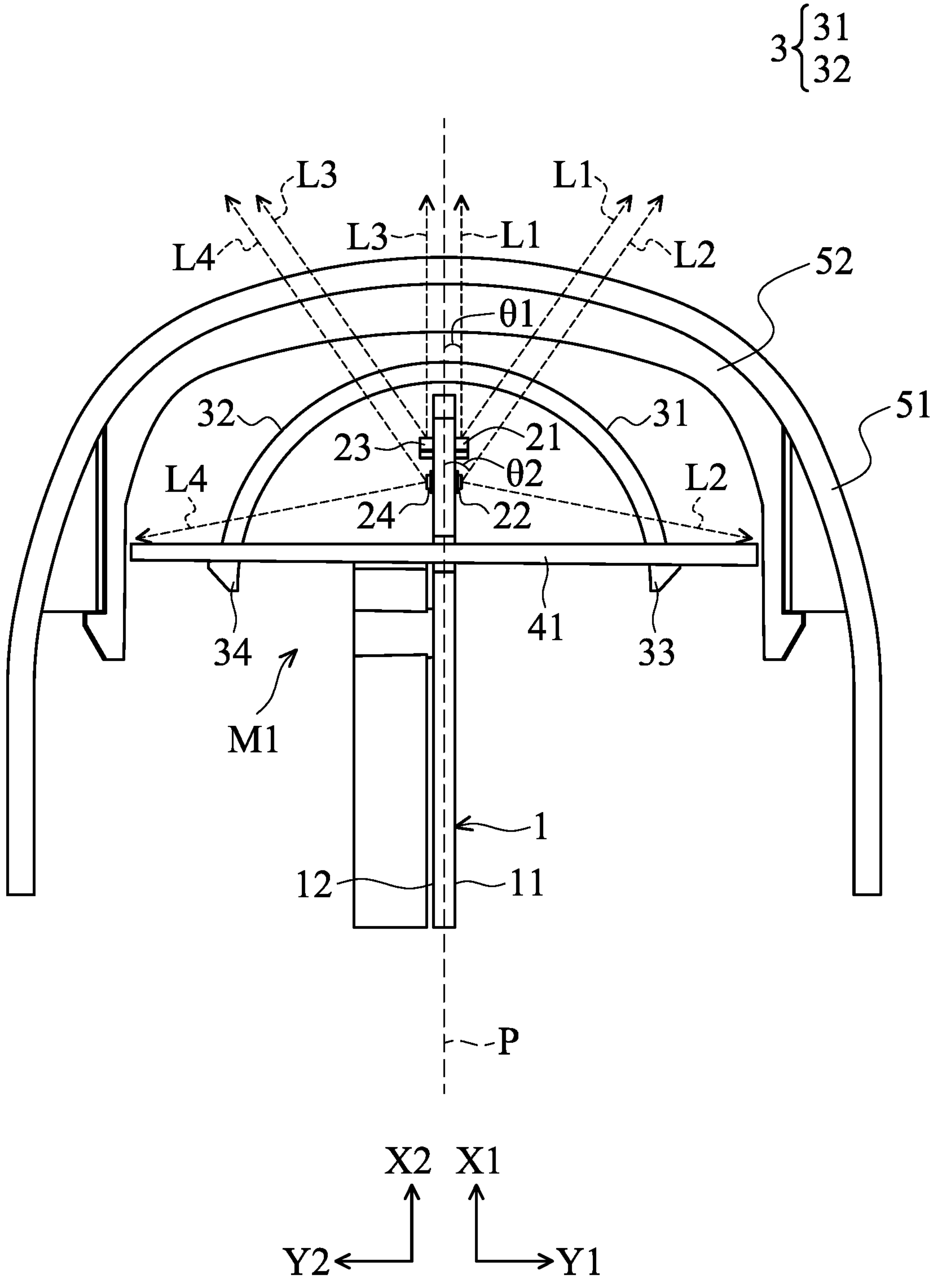
FIG. 2 is a top view of the light-indicating module of the first embodiment of the invention.

FIG. 1 is an exploded view of a portion of a light-indicating module of a first embodiment of the invention. FIG. 2 is a top view of the light-indicating module of the first embodiment of the invention. With reference to FIGS. 1 and 2, the light-indicating module M1 of the first embodiment of the invention includes a substrate 1, a first light source 21, a second light source 22, and a light guiding element 3. The substrate 1 can be a circuit board or a plastic substrate. The disclosure is not meant to restrict the invention. The substrate 1 comprises a first surface 11 and a second surface 12. The first surface 11 is opposite to the second surface 12. The first light source 21 is disposed on the first surface 11 of the substrate 1. The first light source 21 faces the first direction X1. The first light source 21 provides a first light beam L1. The second light source 22 is disposed on the first surface 11 of the substrate 1. The second light source 22 faces the second direction Y1. The second light source 22 provides a second light beam L2. The first direction X1 is not parallel to the second direction Y1. The light guiding element 3 comprises a first section 31 and a second section 32. The first section 31 corresponds to the first surface 11. The second section 32 corresponds to the second surface 12. The first light beam L1 and the second light beam L2 pass through the first section 31.

With reference to FIGS. 1 and 2, in one embodiment, the first direction X1 is perpendicular to the second direction Y1.

With reference to FIG. 2, in one embodiment, the included angle θ1 between the first light beam L1 and the first surface 11 is between 0 degrees and 60 degrees. The included angle θ2 between the second light beam L2 and the first surface 11 is between 30 degrees and 130 degrees. In one embodiment, the first light beam L1 of the first light source 21 has a first beam angle (between the two straight lines labeled by L1 in FIG. 2), and the first beam angle can between 50 degrees and 75 degrees. The second light beam L2 of the first light source 22 has a second beam angle (between the two straight lines labeled by L2 in FIG. 2), and the second beam angle can between 50 degrees and 75 degrees. In one embodiment, the first light beam L1 may overlap a portion of the second light beam L2.

With reference to FIGS. 1 and 2, in one embodiment, the electronic device M1 further includes a third light source 23 and a fourth light source 24. The third light source 23 is disposed on the second surface 12 of the substrate 1. The third light source 23 faces a third direction X2. The third light source 23 provides a third light beam L3. The fourth light source 24 is disposed on the second surface 12 of the substrate 1. The fourth light source 24 faces a fourth direction Y2. The fourth light source 24 provides a fourth light beam L4. The third direction X2 is not parallel to the fourth direction Y2. The third light beam L3 and the fourth light beam LA pass through the second section 32. In one embodiment, the third direction X2 is perpendicular to the fourth direction Y2.

With reference to FIG. 2, in one embodiment, the first direction X1 is parallel to the third direction X2, and the second direction Y1 is opposite to the fourth direction Y2.

With reference to FIG. 2, in one embodiment, the light guiding element 3 has a plane of symmetry P, and the substrate 1 is configured on the plane of symmetry P.

With reference to FIGS. 1 and 2, in one embodiment, the light-indicating module M1 further comprises a mounting plate 41. The mounting plate 41 is connected to the substrate 1. The mounting plate 41 is perpendicular to the substrate 1. The light guiding element 3 is connected to the mounting plate 41.

With reference to FIGS. 1 and 2, in one embodiment, the mounting plate 41 comprises a first mounting portion 411 and a second mounting portion 412. The light guiding element 3 comprises a first wedging portion 33 and a second wedging portion 34. The first wedging portion 33 is formed on one end of the light guiding element 3. The second wedging portion 34 is formed on the other end of the light guiding element 3. The first wedging portion 33 is wedged against the first mounting portion 411, and the second wedging portion 34 is wedged against the second mounting portion 412.

With reference to FIGS. 1 and 2, in one embodiment, the substrate 1 comprises a first notch 131, and the mounting plate 41 passes through the first notch 131.

Figure 3A:
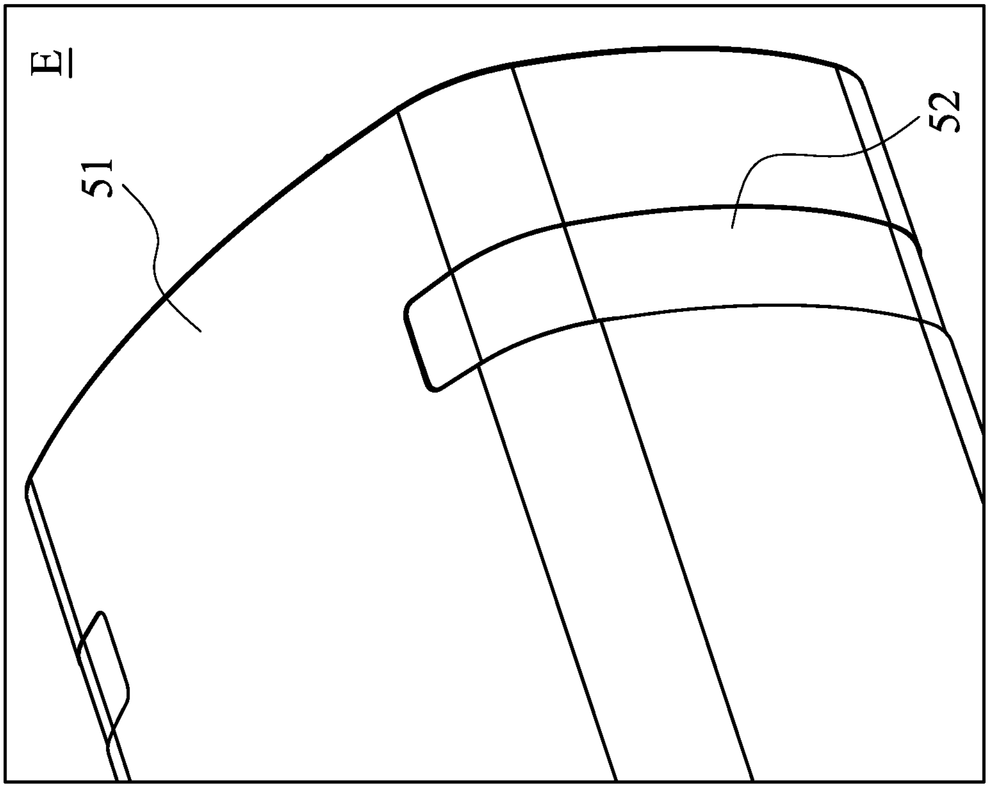
FIG. 3A shows an appearance of a portion of the electronic device of the embodiment of the invention.
Figure 3B:
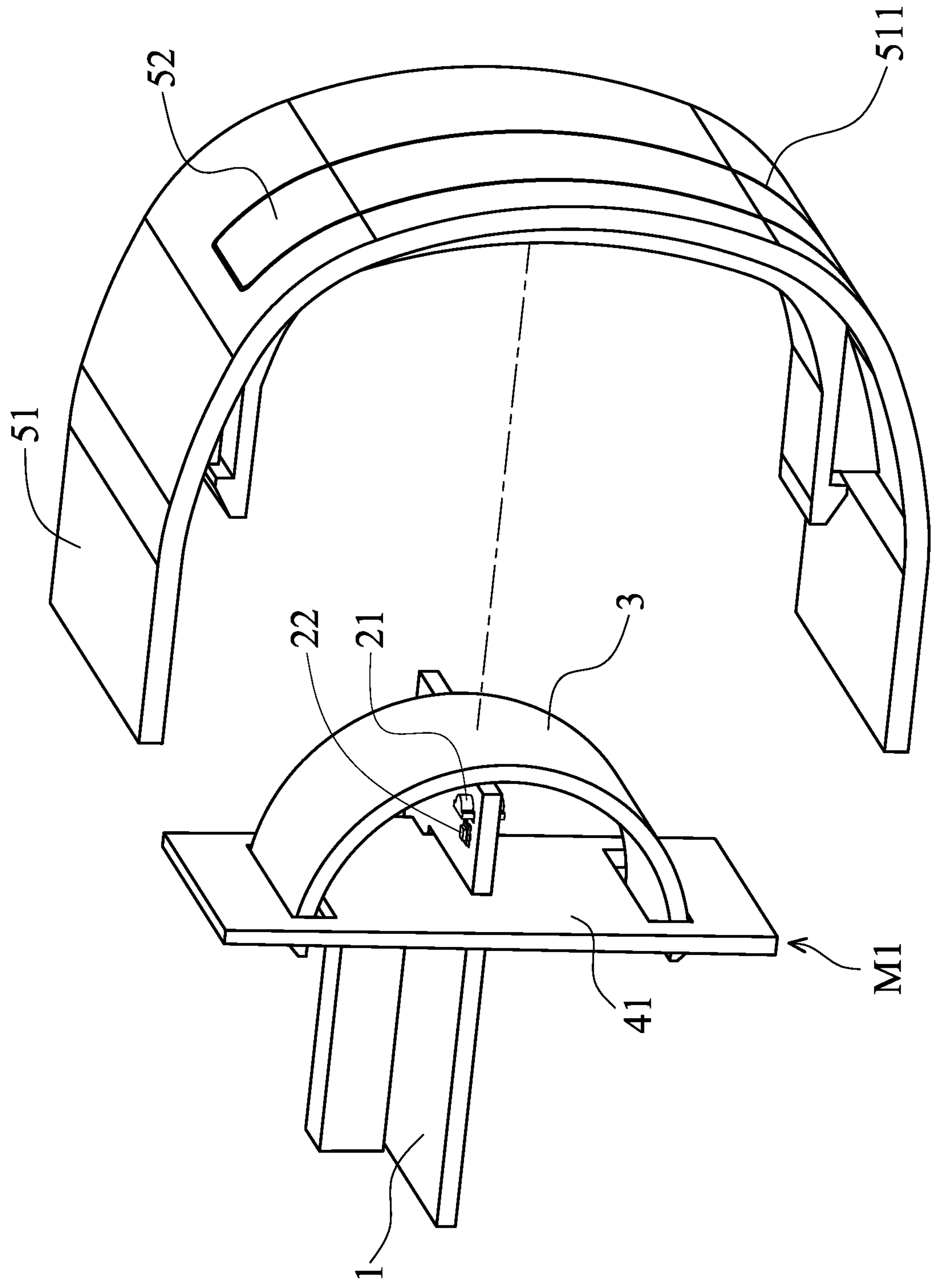
FIG. 3B is an exploded view of a portion of the electronic device of the embodiment of the invention.

FIG. 3A shows an appearance of a portion of the electronic device of the embodiment of the invention. FIG. 3B is an exploded view of a portion of the electronic device of the embodiment of the invention. With reference to FIGS. 2, 3A and 3B, in one embodiment, the electronic device E further comprises a housing 51 and a lampshade 52. The housing 51 has a window 511. The lampshade 52 is disposed in the window 511. The substrate 1, the first light source 21, the second light source 22 and the light guiding element 3 are disposed in the housing 51. The light guiding element 3 corresponds to the lampshade 52.

In one embodiment, the shape and relative position of the light guiding element 3 and the lampshade 52 can be properly designed to improve the uniformity of the light beams.

In one embodiment, the degree of opacity of the lampshade 52 is lower than the degree of opacity of the light guiding element 3.

In one embodiment, the degree of dispersion of the lampshade 52 is lower than the degree of dispersion of the light guiding element 3. Therefore, the lampshade 52 has a clear appearance.

In one embodiment, the light guiding element 3 can be doped with the diffusion agent. The light guiding element 3 can be made of plastic. The light guiding element 3 uniforms the light beams, and reduces bright bands and dark bands.

In one embodiment, the light guiding element 3 has increased transmittance to reduce light loss.

Figure 3C:
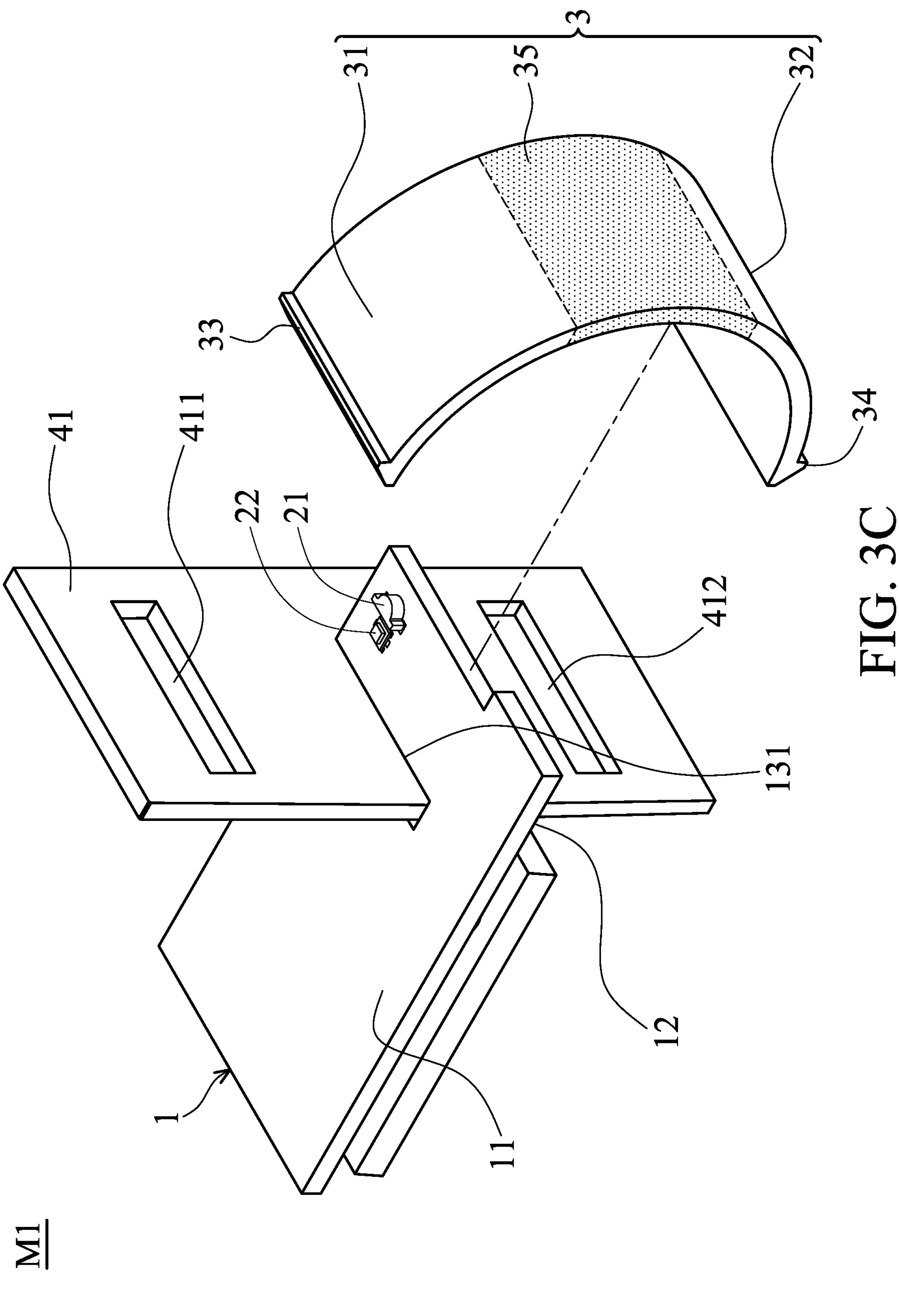
FIG. 3C is a modified embodiment of the invention.

FIG. 3C is a modified embodiment of the invention. With reference to FIG. 3C, in one embodiment, the light guiding element 3 further comprises a light-reduction region 35. The light-reduction region 35 corresponds the first light source 21 and the third light source (not shown). The light-reduction region 35 is utilized to weaken the light by a non-smooth surface structure. In some embodiments, the non-smooth surface may include spherical, arcuate, or conical microstructures. The light-reduction region 35 can avoid bright spots.

Figure 4A:
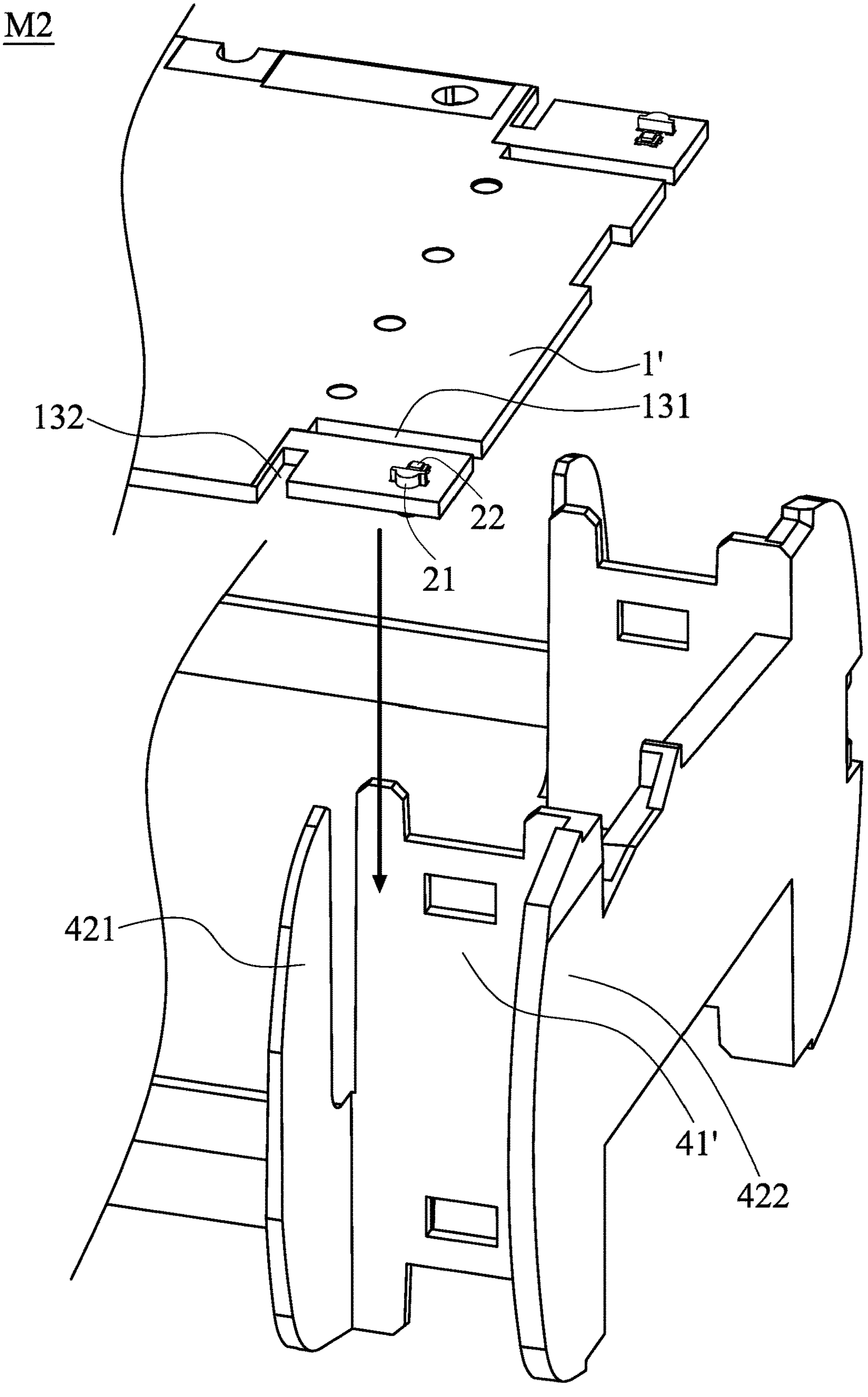
FIG. 4A is an exploded view of a light-indicating module of a second embodiment of the invention.
Figure 4B:
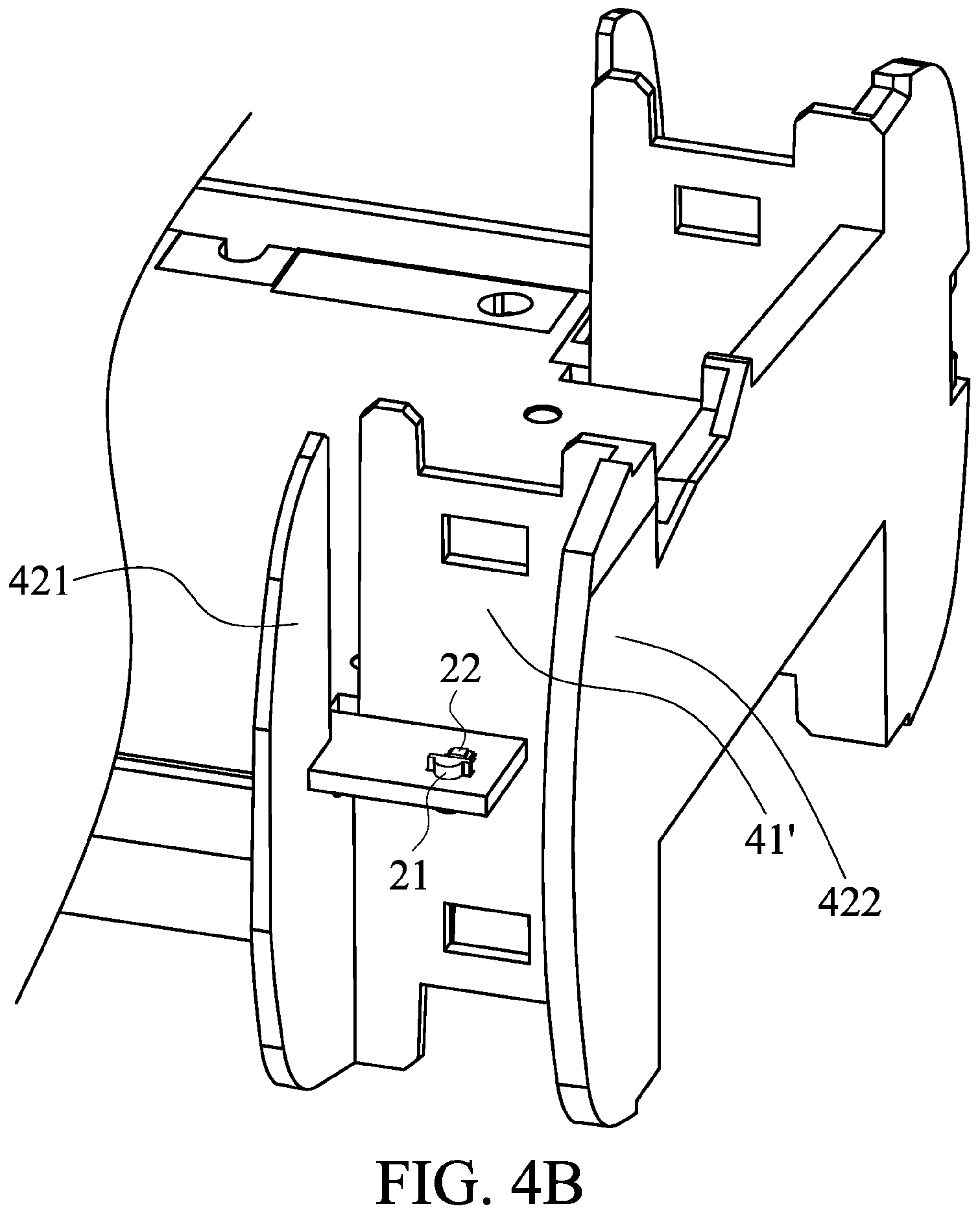
FIG. 4B is an assembled view of the light-indicating module of the second embodiment of the invention.

FIG. 4A is an exploded view of a light-indicating module of a second embodiment of the invention. FIG. 4B is an assembled view of the light-indicating module of the second embodiment of the invention. With reference to FIGS. 4A and 4B, in one embodiment, the light-indicating module M2 further comprises a first shielding plate 421 and a second shielding plate 422. The first light source 21 and the second light source 22 are configured between the first shielding plate 421 and the second shielding plate 422. The shielding plate 421 and the second shielding plate 422 are utilized to restrict the emission range of the light and prevent light leakage.

With reference to FIGS. 4A and 4B, in one embodiment, the substrate 1' comprises a second notch 132. The first shielding plate 421 passes through the second notch 132.

With reference to FIGS. 4A and 4B, in one embodiment, the first shielding plate 421, the second shielding plate 422 and the mounting plate 41' are integrally formed. The extending direction of the first notch 131 is perpendicular to the extending direction of the second notch 132.

In the electronic device of the embodiment of the invention, the first light source and the second light source are disposed directly on the mainboard (substrate), and the first light source and the second light source faces different directions. The first light beam and the second light beam pass through the light guiding element and provide the effect of strip lighting. Compared with the conventional art, the conventional light-source board is omitted. Therefore, the component cost is reduced and the assembly processes is simplified, and product reliability is improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with light-indicating function comprising: a substrate comprising a first surface and a second surface, wherein the first surface is opposite to the second surface; a first light source, disposed on the first surface of the substrate, wherein a first primary optical axis of the first light source extends in a first direction, and the first light source provides a first light beam; a second light source, disposed on the first surface of the substrate, wherein a second primary optical axis of the second light source extends in a second direction, and the second light source provides a second light beam, and the first direction is perpendicular to the second direction; and a light guiding element, comprising a first section and a second section, wherein the first section corresponds to the first surface, the second section corresponds to the second surface, and the first light beam and the second light beam pass through the first section.

2. The electronic device as claimed in claim 1, further comprising a mounting plate, wherein the mounting plate is connected to the substrate, the mounting plate is perpendicular to the substrate, and the light guiding element is connected to the mounting plate.

3. The electronic device as claimed in claim 2, wherein the substrate comprises a first notch, and the mounting plate passes through the first notch.

4. The electronic device as claimed in claim 3, further comprising a first shielding plate and a second shielding plate, wherein the first light source and the second light source are configured between the first shielding plate and the second shielding plate.

5. The electronic device as claimed in claim 4, wherein the substrate comprises a second notch, and the first shielding plate passes through the second notch.

6. The electronic device as claimed in claim 4, wherein the first shielding plate, the second shielding plate and the mounting plate are integrally formed, and an extending direction of the first notch is perpendicular to an extending direction of the second notch.

7. The electronic device as claimed in claim 2, wherein the mounting plate comprises a first mounting portion and a second mounting portion, the light guiding element comprises a first wedging portion and a second wedging portion, the first wedging portion is formed on one end of the light guiding element, the second wedging portion is formed on the other end of the light guiding element, the first wedging portion is wedged against the first mounting portion, and the second wedging portion is wedged against the second mounting portion.

8. The electronic device as claimed in claim 1, further comprising a housing and a lampshade, wherein the housing has a window, the lampshade is disposed in the window, the substrate, the first light source, the second light source and the light guiding element are disposed in the housing, and the light guiding element corresponds to the lampshade.

9. The electronic device as claimed in claim 8, wherein a degree of opacity of the lampshade is lower than a degree of opacity of the light guiding element.

10. The electronic device as claimed in claim 8, wherein a degree of dispersion of the lampshade is lower than a degree of dispersion of the light guiding element.

11. The electronic device as claimed in claim 1, further comprising:

a third light source, disposed on the second surface of the substrate, wherein the third light source faces a third direction, and the third light source provides a third light beam;

a fourth light source, disposed on the second surface of the substrate, wherein the fourth light source faces a fourth direction, the fourth light source provides a fourth light beam, the third direction is not parallel to the fourth direction, and the third light beam and the fourth light beam pass through the second section.

12. The electronic device as claimed in claim 11, wherein the first direction is parallel to the third direction, and the second direction is opposite to the fourth direction.

13. The electronic device as claimed in claim 1, wherein an included angle between the first light beam and the first surface is between 0 degrees and 60 degrees, and an included angle between the second light beam and the first surface is between 30 degrees and 130 degrees.

14. The electronic device as claimed in claim 1, wherein the light guiding element has a plane of symmetry, and the substrate is configured on the plane of symmetry.

15. The electronic device as claimed in claim 1, wherein the light guiding element further comprises a light-reduction region, and the light-reduction region corresponds the first light source.

16. A light-indicating module comprising: a substrate comprising a first surface and a second surface, wherein the first surface is opposite to the second surface; a first light source, disposed on the first surface of the substrate, wherein a first primary optical axis of the first light source extends in a first direction, and the first light source provides a first light beam; a second light source, disposed on the first surface of the substrate, wherein a second primary optical axis of the second light source extends in a second direction, the second light source provides a second light beam, and the first direction is perpendicular to the second direction; and a light guiding element, comprising a first section and a second section, wherein the first section corresponds to the first surface, the second section corresponds to the second surface, and the first light beam and the second light beam pass through the first section.

17. The light-indicating module as claimed in claim 16, further comprising:

a third light source, disposed on the second surface of the substrate, wherein the third light source faces a third direction, and the third light source provides a third light beam;

a fourth light source, disposed on the second surface of the substrate, wherein the fourth light source faces a fourth direction, the fourth light source provides a fourth light beam, the third direction is not parallel to the fourth direction, and the third light beam and the fourth light beam pass through the second section.

18. The light-indicating module as claimed in claim 17, wherein the light guiding element is curved, the light guiding element has a plane of symmetry, and the substrate is configured on the plane of symmetry.

19. The light-indicating module as claimed in claim 18, wherein an included angle between the first light beam and the first surface is between 0 degrees and 60 degrees, and an included angle between the second light beam and the first surface is between 30 degrees and 130 degrees.

* * * * *